(12) United States Patent
Kinoshita et al.

(10) Patent No.: US 11,299,162 B2
(45) Date of Patent: Apr. 12, 2022

(54) VEHICLE CONTROL DEVICE

(71) Applicant: TOYOTA JIDOSHA KABUSHIKI KAISHA, Toyota (JP)

(72) Inventors: Atsuki Kinoshita, Mishima (JP); Ko Igarashi, Susono (JP); Yuki Mori, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 16/502,761

(22) Filed: Jul. 3, 2019

(65) Prior Publication Data

US 2020/0039519 A1 Feb. 6, 2020

(30) Foreign Application Priority Data

Aug. 1, 2018 (JP) .............................. JP2018-145111

(51) Int. Cl.
*B60W 30/18* (2012.01)
*B60W 50/14* (2020.01)
*B60W 50/10* (2012.01)
*B60R 1/00* (2006.01)
*B60K 35/00* (2006.01)

(52) U.S. Cl.
CPC ...... *B60W 30/18163* (2013.01); *B60W 50/10* (2013.01); *B60W 50/14* (2013.01); *B60K 35/00* (2013.01); *B60K 2370/1529* (2019.05); *B60K 2370/175* (2019.05); *B60K 2370/176* (2019.05);

(Continued)

(58) Field of Classification Search
CPC ........... B60W 30/18163; B60W 50/10; B60W 50/14; B60W 2540/215; B60W 2050/146; B60K 2370/1529; B60K 2370/175; B60K 2370/176; B60K 35/00; B60R 1/00
See application file for complete search history.

(56) References Cited

U.S. PATENT DOCUMENTS

2016/0272204 A1 9/2016 Takahashi et al.
2017/0267241 A1* 9/2017 Matsunaga ..... B60W 30/18009
(Continued)

FOREIGN PATENT DOCUMENTS

JP 2008-265503 A 11/2008
JP 2015-011458 A 1/2015
(Continued)

*Primary Examiner* — Michael D Lang
(74) *Attorney, Agent, or Firm* — Sughrue Mion, PLLC (57) ABSTRACT

A vehicle control device includes a display control unit configured to display a preceding vehicle image corresponding to a preceding vehicle and an overtaking proposal activation image based on a relative situation of the preceding vehicle with respect to the host vehicle and a surrounding environment of the host vehicle and configured to control display such that the overtaking proposal activation image and the preceding vehicle image approach each other in response to approaching of the host vehicle and the preceding vehicle, an automatic overtaking proposal unit configured to propose the automatic overtaking to a driver when the overtaking proposal activation image reaches the preceding vehicle image on the display screen, and a vehicle control unit configured to execute the automatic overtaking of the preceding vehicle by the host vehicle when the approval determination unit determines that the driver has approved the automatic overtaking.

4 Claims, 7 Drawing Sheets

(52) U.S. Cl.
CPC .......... *B60R 1/00* (2013.01); *B60W 2050/146* (2013.01); *B60W 2540/215* (2020.02)

(56) References Cited

U.S. PATENT DOCUMENTS

2018/0178801 A1    6/2018  Hashimoto et al.
2018/0218713 A1*   8/2018  Kusanagi ............... G02B 27/01

FOREIGN PATENT DOCUMENTS

| JP | 2016-168985 A | 9/2016 |
| JP | 2018-105692 A | 7/2018 |
| WO | 2016/170635 A1 | 10/2016 |

* cited by examiner

VEHICLE CONTROL DEVICE

TECHNICAL FIELD

The present disclosure relates to a vehicle control device.

CROSS-REFERENCE TO RELATED APPLICATION

This application claims the benefit of priority from Japanese Patent Application No. 2018-145111, filed Aug. 1, 2018, the entire contents of which are incorporated herein by reference.

BACKGROUND ART

Japanese Unexamined Patent Publication No. 2015-11458 is known as a technical literature related to a vehicle control device. The publication describes an information providing device for use in vehicles. The device indicates whether or not a host vehicle is capable of changing lanes based on surrounding situation information regarding the host vehicle. The device is provided with a display unit. The display unit displays available remaining time when the lane change is possible and displays unavailable remaining time when the lane change is impossible.

SUMMARY OF INVENTION

Technical Problem

It is conceivable to propose automatic overtaking to a driver when a vehicle catches up with a preceding vehicle and execute the automatic overtaking in response to input from the driver. However, perfect matching cannot be easily achieved between the timing of the automatic overtaking proposal in vehicle control and a timing when the driver wishes to overtake the preceding vehicle. It is conceivable that the driver may initiate manual preceding vehicle overtaking prior to the automatic overtaking proposal, and thus there is room for consideration.

In this technical field, it is desired in this regard to provide a vehicle control device that is capable of suppressing a driver initiating manual operation-based unnecessary preceding vehicle overtaking prior to an automatic overtaking proposal.

Solution to Problem

In order to solve the above problems, a vehicle control device according to an aspect of the present disclosure controls a host vehicle and provides a driver of the host vehicle with information related to the vehicle control by using a display screen of the host vehicle. The vehicle control device includes a preceding vehicle recognition unit configured to recognize a relative situation of a preceding vehicle with respect to the host vehicle, a surrounding environment recognition unit configured to recognize a surrounding environment of the host vehicle, a display control unit configured to display a preceding vehicle image corresponding to the preceding vehicle and an overtaking proposal activation image for indicating a timing of activation of a proposal for automatic overtaking of the preceding vehicle by the host vehicle on the display screen based on the relative situation of the preceding vehicle with respect to the host vehicle and the surrounding environment of the host vehicle and configured to control display such that the overtaking proposal activation image and the preceding vehicle image approach each other in response to approaching of the host vehicle and the preceding vehicle, an automatic overtaking proposal unit configured to propose the automatic overtaking to the driver when the overtaking proposal activation image reaches the preceding vehicle image on the display screen, an approval determination unit configured to determine whether or not the driver has approved the automatic overtaking, and a vehicle control unit configured to execute the automatic overtaking of the preceding vehicle by the host vehicle when the approval determination unit determines that the driver has approved the automatic overtaking.

In the vehicle control device according to an aspect of the present disclosure, the overtaking proposal activation image and the preceding vehicle image are displayed based on the relative situation between the host vehicle and the preceding vehicle as an automatic overtaking target and automatic overtaking is proposed to the driver, when the overtaking proposal activation image has reached the preceding vehicle image. Accordingly, a driver can understand an automatic overtaking proposal activation timing with greater ease than when the overtaking proposal activation image and the preceding vehicle image are not displayed. Accordingly, the vehicle control device is capable of suppressing a driver initiating manual operation-based unnecessary preceding vehicle overtaking without being capable of understanding the timing of activation of the automatic overtaking proposal with respect to the preceding vehicle.

In the vehicle control device according to an aspect of the present disclosure, the display control unit may be configured to display the overtaking proposal activation image and the preceding vehicle image on the display screen, when time to collision between the host vehicle and the preceding vehicle is less than a TTC threshold and the host vehicle is capable of changing lanes from a traveling lane to an adjacent lane.

A vehicle control device according to another aspect of the present disclosure controls a host vehicle and provides a driver of the host vehicle with information related to the vehicle control by using a HUD performing projection display on a windshield of the host vehicle. The vehicle control device includes a preceding vehicle recognition unit configured to recognize a relative situation of a preceding vehicle with respect to the host vehicle, a surrounding environment recognition unit configured to recognize a surrounding environment of the host vehicle, a display control unit configured to project and display an overtaking proposal activation image for indicating a timing of activation of a proposal for automatic overtaking of the preceding vehicle by the host vehicle on the windshield based on the relative situation of the preceding vehicle with respect to the host vehicle and the surrounding environment of the host vehicle, an automatic overtaking proposal unit configured to propose the automatic overtaking to the driver when the overtaking proposal activation image reaches the preceding vehicle on the windshield as seen from the driver, an approval determination unit configured to determine whether or not the driver has approved the automatic overtaking, and a vehicle control unit configured to execute the automatic overtaking of the preceding vehicle by the host vehicle when the approval determination unit determines that the driver has approved the automatic overtaking.

In the vehicle control device according to another aspect of the present disclosure, the overtaking proposal activation image is projected and displayed on the windshield based on the relative situation between the host vehicle and the preceding vehicle as an automatic overtaking target and automatic overtaking is proposed to the driver when the overtaking proposal activation image has reached the preceding vehicle on the windshield as seen from the driver. Accordingly, a driver can understand an automatic overtaking proposal activation timing with greater ease than when the overtaking proposal activation image is not displayed. Accordingly, the vehicle control device is capable of suppressing a driver initiating manual operation-based unnecessary overtaking of the preceding vehicle without being capable of understanding the timing of activation of the automatic overtaking proposal with respect to the preceding vehicle.

In the vehicle control device according to another aspect of the present disclosure, the display control unit may be configured to project and display the overtaking proposal activation image on the windshield, when time to collision between the host vehicle and the preceding vehicle is less than a TTC threshold and the host vehicle is capable of changing lanes from a traveling lane to an adjacent lane.

Advantageous Effects of Invention

As described above, according to at least one of an aspect and another aspect of the present disclosure, it is possible to suppress a driver initiating manual operation-based unnecessary preceding vehicle overtaking prior to an automatic overtaking proposal.

DESCRIPTION OF EMBODIMENTS

Hereinafter, embodiments of the present disclosure will be described with reference to accompanying drawings.

First Embodiment

Figure 1:
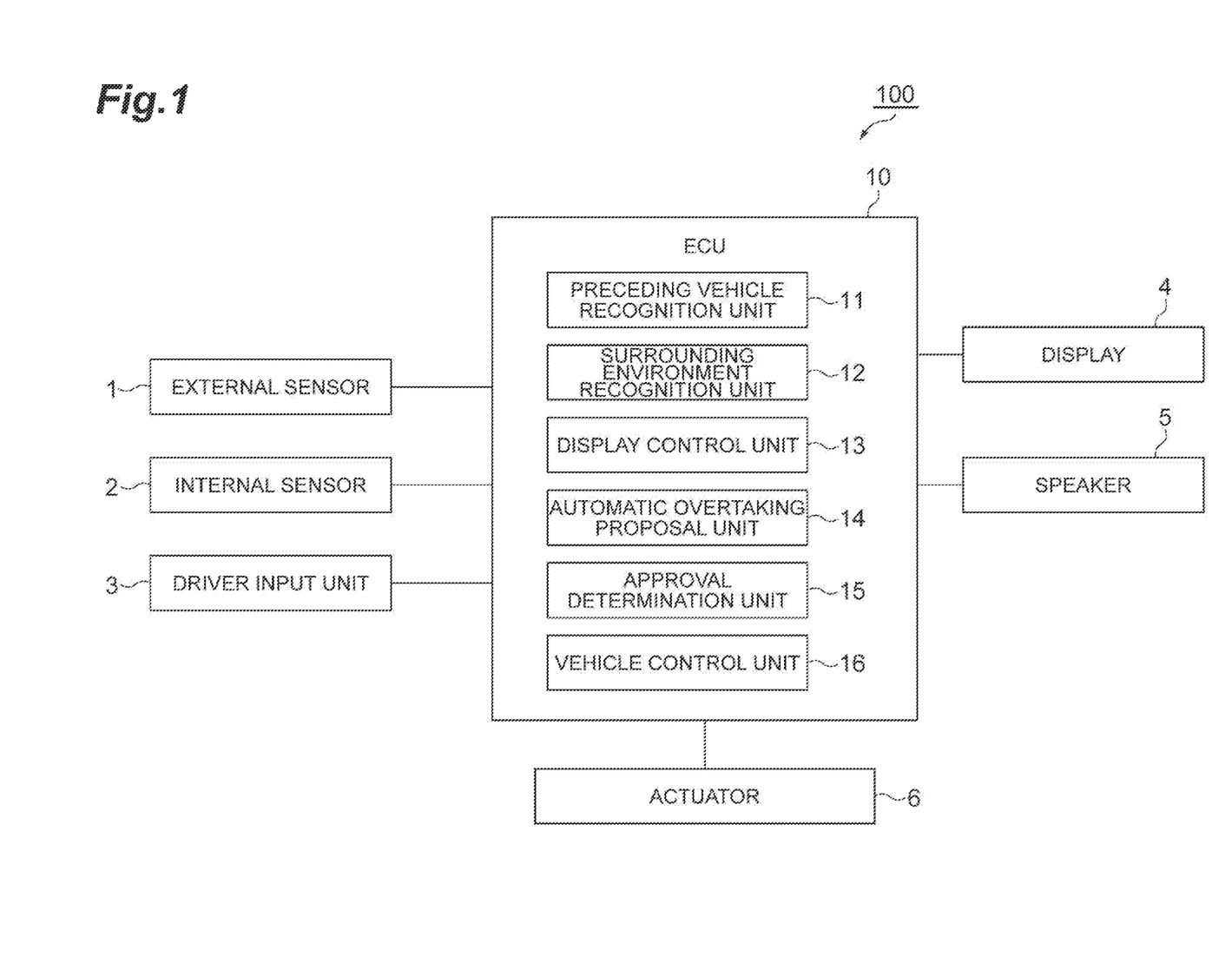
FIG. 1 is a block diagram illustrating a vehicle control device according to a first embodiment.

FIG. 1 is a block diagram illustrating a vehicle control device according to a first embodiment. A vehicle control device 100 according to the first embodiment illustrated in FIG. 1 is mounted in a vehicle (host vehicle) such as a passenger car, performs host vehicle control, and provides a driver with information related to the vehicle control. The vehicle control device 100 performs automatic overtaking as the host vehicle control.

The automatic overtaking is vehicle control for automatically overtaking a preceding vehicle traveling directly ahead of the host vehicle in the traveling lane of the host vehicle. During the automatic overtaking, the host vehicle changes lanes from the traveling lane to an adjacent lane and overtakes the preceding vehicle by traveling in the adjacent lane at a vehicle speed equal to or higher than the vehicle speed of the preceding vehicle. The vehicle control device 100 provides the driver with information on the automatic overtaking as the vehicle control-related information and proposes the automatic overtaking. The host vehicle executes the automatic overtaking of the preceding vehicle when the driver approves the automatic overtaking.

Configuration of Vehicle Control Device of First Embodiment

As illustrated in FIG. 1, the vehicle control device 100 is provided with an electronic control unit [ECU] 10 comprehensively managing systems. The ECU 10 is an electronic control unit that has a central processing unit [CPU], a read only memory [ROM], a random access memory [RAM], a controller area network [CAN] communication circuit, and the like. The ECU 10 realizes various functions by, for instance, loading a program stored in the ROM into the RAM and executing the program loaded into the RAM with the CPU. A plurality of electronic units may constitute the ECU 10 as well.

The ECU 10 is connected to an external sensor 1, an internal sensor 2, a driver input unit 3, a display 4, a speaker 5, and an actuator 6.

The external sensor 1 is a detection device detecting a situation around the host vehicle. The external sensor 1 includes at least one of a camera and a radar sensor.

The camera is imaging equipment imaging the external situation regarding the host vehicle. The camera is provided on the back side of the windshield of the host vehicle and images a space in front of the vehicle. The camera transmits imaging information related to the external situation regarding the host vehicle to the ECU 10. The camera may be a monocular camera or may be a stereo camera.

The radar sensor is detection equipment detecting obstacles around the vehicle by using at least one of radio waves (such as millimeter waves) and light. The radar sensor includes, for instance, at least one of a millimeter wave radar device and a light detection and ranging [LIDAR] device. The radar sensor detects the obstacles by transmitting at least one of the radio waves and the light to the surroundings of the host vehicle and receiving at least one of the radio waves and the light reflected by the obstacles. The radar sensor transmits detected obstacle information to the ECU 10. The obstacles include moving obstacles such as pedestrians, bicycles, and non-host vehicles as well as stationary obstacles such as guardrails and buildings.

The internal sensor 2 is a detection device detecting the traveling state of the host vehicle. The internal sensor 2 includes a vehicle speed sensor, an acceleration sensor, and a yaw rate sensor. The vehicle speed sensor is a detector that detects the speed of the host vehicle. A vehicle wheel speed sensor that is provided with respect to, for instance, at least one of a vehicle wheel of the host vehicle and a drive shaft rotating integrally with the vehicle wheel and detects the rotation speed of the vehicle wheel is used as the vehicle speed sensor. The vehicle speed sensor transmits detected vehicle speed information to the ECU 10.

The acceleration sensor is a detector that detects the acceleration of the host vehicle. The acceleration sensor includes, for instance, a longitudinal acceleration sensor detecting the acceleration of the host vehicle in a longitudinal direction and a lateral acceleration sensor detecting the lateral acceleration of the host vehicle. The acceleration sensor transmits, for instance, acceleration information regarding the host vehicle to the ECU 10. The yaw rate sensor is a detector that detects the yaw rate (rotation angular velocity) around the vertical axis of the center of the host vehicle. A gyro sensor or the like can be used as the yaw rate sensor. The yaw rate sensor transmits detected yaw rate information regarding the host vehicle to the ECU 10.

The driver input unit 3 is an input device for a driver to input an automatic overtaking approval. The driver input unit 3 can be, for instance, a touch panel. The driver input unit 3 may be at least one of a button and a lever and may be a voice input device. Methods by which a driver inputs an automatic overtaking approval are not particularly limited.

The display 4 is a display device provided in front of a driver in the host vehicle. The display 4 is provided with respect to, for instance, the dashboard of the host vehicle. The display 4 has a display screen for displaying an image with respect to a driver. The display 4 displays an image on the display screen based on a control signal from the ECU 10. The display 4 may be a head up display [HUD] that performs projection display on at least one of the windshield and the projection screen of the host vehicle.

The speaker 5 is a voice output device mounted in the host vehicle and performing voice output with respect to a driver. The speaker 5 is provided inside, for instance, the door of a driver's seat. The speaker 5 performs the voice output based on a control signal from the ECU 10.

The actuator 6 is a device that is used for host vehicle control. The actuator 6 includes at least a drive actuator, a brake actuator, and a steering actuator. The drive actuator controls the drive force of the host vehicle by controlling the amount of air supply to an engine in accordance with a control signal from the ECU 10. When the host vehicle is a hybrid vehicle, the drive force is controlled by a control signal from the ECU 10 being input to a motor as a power source as well as by means of the amount of air supply to an engine. When the host vehicle is an electric vehicle, the drive force is controlled by a control signal from the ECU 10 being input to a motor as a power source. The motors as a power source in these cases constitute the actuator 6.

The brake actuator controls a brake system in accordance with a control signal from the ECU 10 and controls a braking force given to the vehicle wheel of the host vehicle. A hydraulic brake system or the like can be used as the brake system. The steering actuator controls, in accordance with a control signal from the ECU 10, driving of an assist motor that controls a steering torque in an electric power steering system. In this manner, the steering actuator controls the steering torque of the host vehicle.

The functional configuration of the ECU 10 will be described below. The ECU 10 has a preceding vehicle recognition unit 11, a surrounding environment recognition unit 12, a display control unit 13, an automatic overtaking proposal unit 14, an approval determination unit 15, and a vehicle control unit 16. Some of the functions of the ECU 10 may be executed in a server capable of communicating with the host vehicle.

The preceding vehicle recognition unit 11 recognizes the relative situation of the preceding vehicle with respect to the host vehicle based on a detection result of the external sensor 1 (at least one of the obstacle information of the radar sensor and the imaging information of the camera). The relative situation of the preceding vehicle with respect to the host vehicle includes the relative distance (inter-vehicle distance) between the host vehicle and the preceding vehicle and the relative vehicle speed of the preceding vehicle with respect to the host vehicle.

The surrounding environment recognition unit 12 recognizes the surrounding environment regarding the vehicle based on the detection result of the external sensor 1 (at least one of the obstacle information of the radar sensor and the imaging information of the camera). The surrounding environment includes the presence or absence of an adjacent lane adjacent to the traveling lane of the host vehicle and the situations of obstacles (including non-host vehicles) around the host vehicle. The surrounding environment includes the situation of a non-host vehicle traveling in the adjacent lane (such as the presence or absence of the non-host vehicle, the position of the non-host vehicle, and the relative vehicle speed of the non-host vehicle with respect to the host vehicle) when the adjacent lane is present. The surrounding environment recognition unit 12 recognizes the presence of the adjacent lane by recognizing the white line of the adjacent lane based on, for instance, the detection result of the external sensor 1. When the position of the host vehicle on a map is recognized, the surrounding environment recognition unit 12 may recognize the presence of the adjacent lane by using map information.

The display control unit 13 displays an overtaking proposal activation image, a host vehicle image, and a preceding vehicle image on the display screen of the display 4, based on the relative situation of the preceding vehicle with respect to the host vehicle and the surrounding environment regarding the host vehicle. The overtaking proposal activation image is an image display for indicating the timing of activation of a proposal for automatic preceding vehicle overtaking by the host vehicle. The host vehicle image is an image display corresponding to the host vehicle. The preceding vehicle image is an image display corresponding to the preceding vehicle. The host vehicle image and the preceding vehicle image may be simplified images. The display control unit 13 displays the overtaking proposal activation image at a position between the host vehicle image and the preceding vehicle image. The display control unit 13 performs display control such that the host vehicle image and the overtaking proposal activation image approach the preceding vehicle image in response to approaching of the host vehicle and the preceding vehicle.

The display control unit 13 determines whether or not a preset display condition is satisfied based on the relative situation of the preceding vehicle with respect to the host vehicle and the surrounding environment regarding the host vehicle. The display condition is satisfied when, for instance, the time to collision [TTC] between the host vehicle and the preceding vehicle is less than a TTC threshold and the host vehicle is capable of changing lanes from the traveling lane to an adjacent lane. The TTC threshold is a preset threshold.

The display control unit 13 may change the TTC threshold based on a driver's driving history. The display control unit 13 may change the TTC threshold based on the time to collision between the host vehicle and the preceding vehicle at the time of a driver's overtaking during manual driving. The display control unit 13 may use, as the TTC threshold, at least one of the average and median values of the time to collision at the time of a driver's overtaking during manual driving. The display control unit 13 may use, as the TTC threshold, the value that is obtained by a set value set in advance being added to at least one of the average and median values of the time to collision.

The display control unit 13 recognizes that the host vehicle is capable of changing lanes from the traveling lane to the adjacent lane when, for instance, the adjacent lane adjacent to the traveling lane is present. The display control unit 13 may further refer to traffic rule information and recognize that the host vehicle is capable of changing lanes from the traveling lane to the adjacent lane only when the host vehicle travels in a section where a lane change is permitted on traffic rules. The traffic rule information may be acquired from map information and may be acquired by a roadside traffic sign being recognized based on the imaging information of the camera.

The display control unit 13 may recognize that the host vehicle is capable of changing lanes from the traveling lane to the adjacent lane when no lane change-hindering non-host vehicle is present on the adjacent lane. The lane change-hindering non-host vehicle is, for instance, a non-host vehicle traveling in the adjacent lane and can be a non-host vehicle equal to or less than a preset threshold in terms of time to collision with respect to the host vehicle in the direction of extension of the traveling lane (direction of extension of the adjacent lane). The lane change-hindering non-host vehicle may be recognized by another known method pertaining to the technical field of lane change control.

Figure 2A:
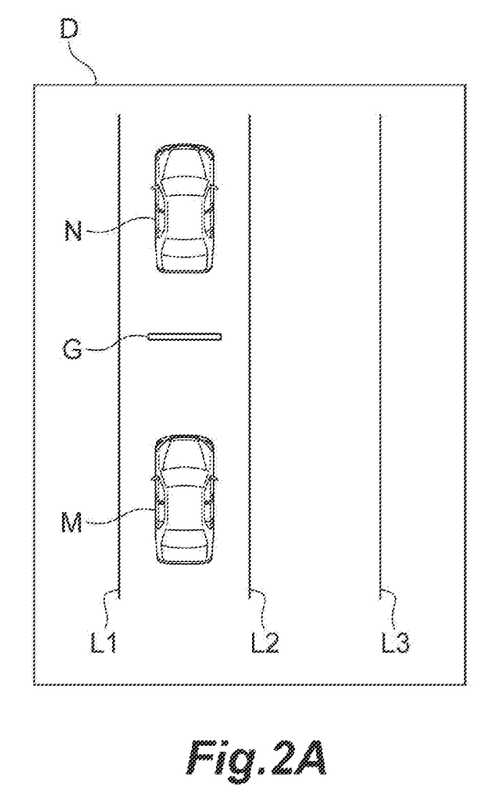
FIG. 2A is a diagram illustrating display of an overtaking proposal activation image, a host vehicle image, and a preceding vehicle image on a display screen.

When the display control unit 13 determines that the display condition is satisfied, the display control unit 13 displays the overtaking proposal activation image, the host vehicle image, and the preceding vehicle image on the display screen of the display 4. Here, FIG. 2A is a diagram illustrating the display of the overtaking proposal activation image, the host vehicle image, and the preceding vehicle image on the display screen. A display screen D, an overtaking proposal activation image G, a host vehicle image M, and a preceding vehicle image N are illustrated in FIG. 2A. Also illustrated are a first division line image L1 corresponding to the left division line of the traveling lane of the host vehicle, a second division line image L2 corresponding to the right division line of the traveling lane (left division line of the adjacent lane), and a third division line image L3 corresponding to the right division line of the adjacent lane.

As illustrated in FIG. 2A, the display control unit 13 displays the host vehicle image M and the preceding vehicle image N to correspond to the relative situation between the host vehicle and the preceding vehicle. The display control unit 13 displays the overtaking proposal activation image G at a position between the host vehicle image M and the preceding vehicle image N. The overtaking proposal activation image G is a linear display extending in the width direction of the lane. The shape of the overtaking proposal activation image G is not limited to the linear shape. The overtaking proposal activation image G may be V-shaped, triangular, or rectangular. The overtaking proposal activation image G may be an area extending forward from the host vehicle image M. The overtaking proposal activation image G may have any shape insofar as the driver can be notified of the timing of activation of the proposal for automatic preceding vehicle overtaking by the host vehicle.

The display control unit 13 displays the overtaking proposal activation image G at, for instance, a position that is at a predetermined distance from the host vehicle image M on the display screen D. The display control unit 13 performs the display such that the host vehicle image M and the overtaking proposal activation image G approach the preceding vehicle image N in response to approaching of the host vehicle and the preceding vehicle.

Figure 2B:
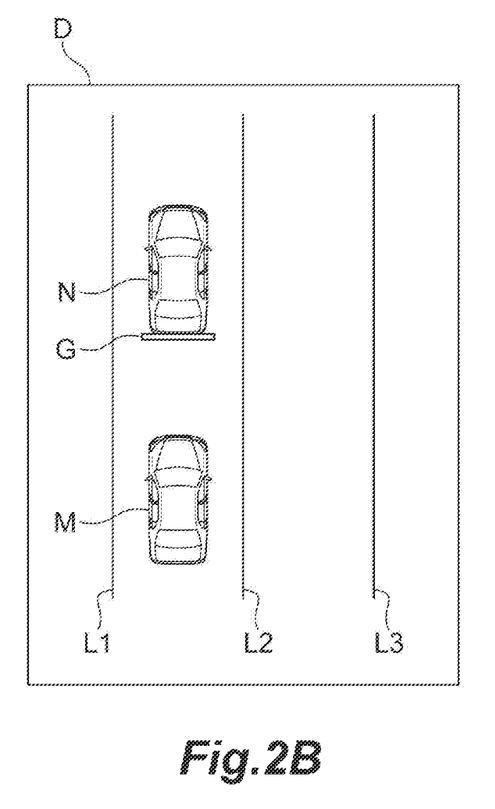
FIG. 2B is a diagram illustrating a time when the overtaking proposal activation image has reached the preceding vehicle image.

FIG. 2B is a diagram illustrating a time when the overtaking proposal activation image G has reached the preceding vehicle image N. As illustrated in FIG. 2B, the display control unit 13 controls display such that the overtaking proposal activation image G reaches the preceding vehicle image N at a timing when automatic overtaking is performed on the driver of the host vehicle. The timing at which automatic overtaking is proposed to the driver of the host vehicle is a preset timing. The timing at which automatic overtaking is proposed to the driver of the host vehicle can be, for instance, a timing when the time to collision between the host vehicle and the preceding vehicle has become less than a preset automatic overtaking proposal threshold. At this time, the display control unit 13 controls display such that the overtaking proposal activation image G reaches the preceding vehicle image N when the time to collision between the host vehicle and the preceding vehicle has become less than the preset automatic overtaking proposal threshold.

The overtaking proposal activation image G reaching the preceding vehicle image N is not limited to a case where the end portion of the overtaking proposal activation image G (on the preceding vehicle image N side) strictly comes into contact with the preceding vehicle image N. The overtaking proposal activation image G reaching the preceding vehicle image N may be determined when a part of the overtaking proposal activation image G overlaps the preceding vehicle image N. In this determination, a deviation attributable to image accuracy or calculation accuracy is allowed.

When the overtaking proposal activation image G reaches the preceding vehicle image N on the display screen D, the automatic overtaking proposal unit 14 proposes automatic overtaking to the driver. The automatic overtaking proposal unit 14 may determine that the overtaking proposal activation image G has reached the preceding vehicle image N on the display screen D when the time to collision between the host vehicle and the preceding vehicle has become less than the preset automatic overtaking proposal threshold.

The automatic overtaking proposal unit 14 proposes automatic overtaking to the driver by transmitting a control signal to the speaker 5. The automatic overtaking proposal unit 14 proposes to the driver by voice output that the preceding vehicle is overtaken by, for instance, the host vehicle changing lanes. The voice output includes a buzzer-only case.

The automatic overtaking proposal unit 14 may display an image display of automatic overtaking proposal on the display 4 in addition to the speaker 5. The automatic overtaking proposal unit 14 may propose automatic overtaking only with the image display on the display 4. During autonomous host vehicle driving, the automatic overtaking proposal unit 14 may alert the driver by means of vibration of at least one of the steering wheel and the driver's seat in addition to at least one of the voice output and the image display.

The approval determination unit 15 determines, based on the input result of the driver input unit 3, whether or not the driver has approved the automatic overtaking. The approval determination unit 15 recognizes that the driver has approved the automatic overtaking when, for instance, the driver has touched an automatic overtaking execution icon displayed on the touch panel that constitutes the driver input unit 3. The approval determination unit 15 determines that the driver has declined the automatic overtaking when the driver has touched an icon displayed on the touch panel constituting the driver input unit 3 and indicating the lack of necessity of automatic overtaking. The approval determination unit 15 may determine that the driver has declined the automatic overtaking when the driver has input nothing for a certain period of time since an automatic overtaking proposal. The input from the driver is not limited to the touching of the touch panel and may be based on button operation, voice recognition, and so on.

The vehicle control unit 16 executes the automatic preceding vehicle overtaking by the host vehicle when the approval determination unit 15 determines that the driver has approved the automatic overtaking. The vehicle control unit 16 executes the automatic overtaking by the host vehicle by transmitting a control signal to the actuator 6. The vehicle control unit 16 is capable of executing the automatic overtaking by known vehicle control. The automatic overtaking may be executed by lane change control-vehicle speed control combination.

Processing of Vehicle Control Device According to First Embodiment

Figure 3:
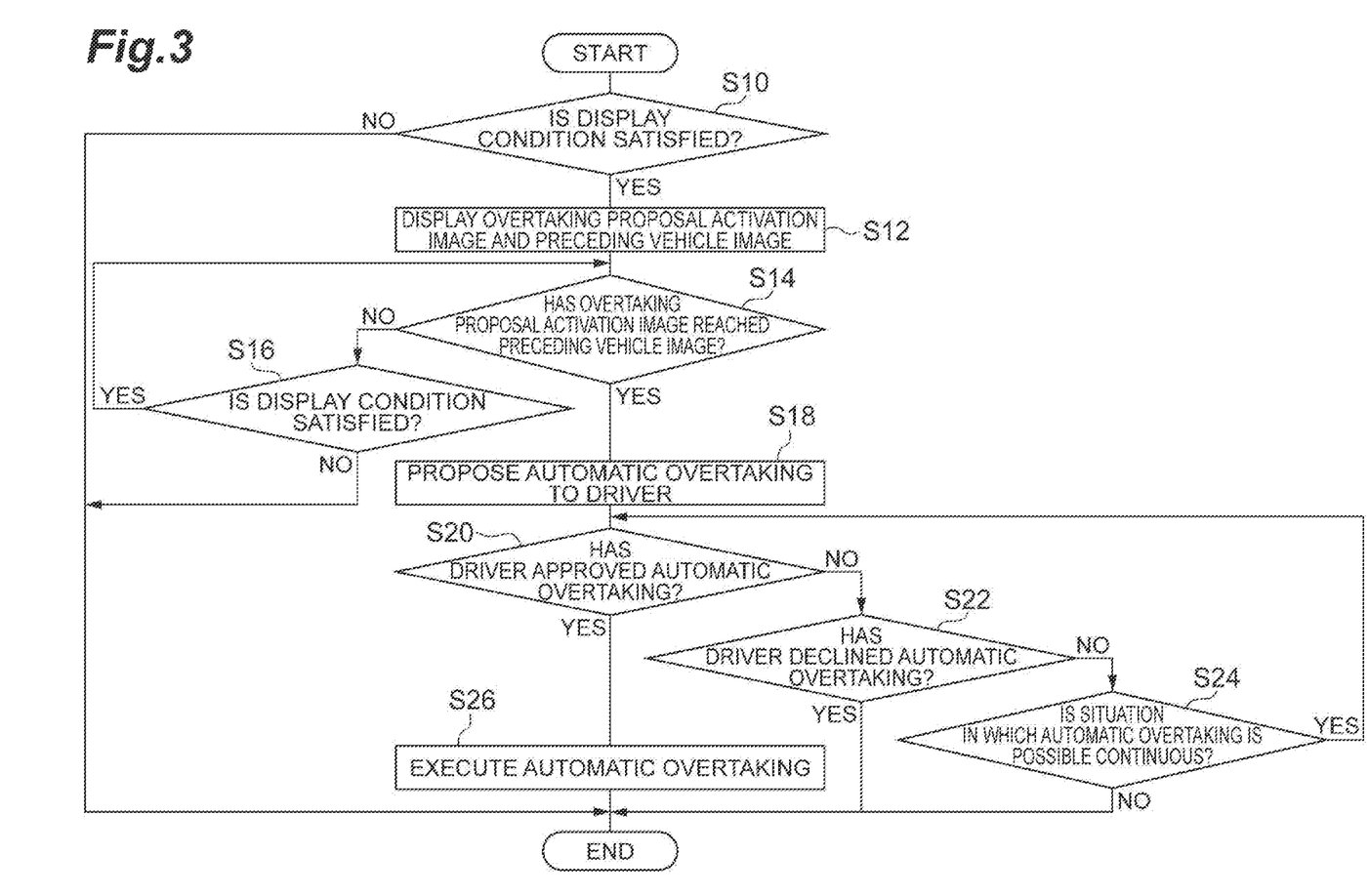
FIG. 3 is a flowchart illustrating an instance of automatic overtaking processing in the vehicle control device of the first embodiment.

Next, processing of the vehicle control device 100 according to the first embodiment will be described. FIG. 3 is a flowchart illustrating an instance of the automatic overtaking processing in the vehicle control device 100 according to the first embodiment. The automatic overtaking processing is executed during, for instance, autonomous driving of the host vehicle. Alternatively, the automatic overtaking processing is executed when the driver permits an automatic overtaking proposal during traveling of the host vehicle.

As illustrated in FIG. 3, the display control unit 13 of the ECU 10 determines in S10 whether or not the display condition is satisfied. The display control unit 13 determines whether or not the display condition is satisfied based on the relative situation of the preceding vehicle with respect to the host vehicle and the surrounding environment regarding the host vehicle. The ECU 10 terminates the current processing when the display control unit 13 does not determine that the display condition is satisfied (S10: NO). The ECU 10 repeats the processing from S10 after the elapse of a predetermined time. The ECU 10 proceeds to S12 when the display control unit 13 determines that the display condition is satisfied (S10: YES).

In S12, the display control unit 13 of the ECU 10 displays the overtaking proposal activation image C the host vehicle image M, and the preceding vehicle image N on the display screen of the display 4. The display control unit 13 performs the display by transmitting a control signal to the display 4. The display control unit 13 displays the overtaking proposal activation image G, the host vehicle image M, and the preceding vehicle image N based on the relative situation of the preceding vehicle with respect to the host vehicle. Subsequently, the ECU 10 proceeds to S14. The host vehicle image M does not necessarily have to be displayed.

In S14, the ECU 10 determines in the display control unit 13 whether or not the overtaking proposal activation image G has reached the preceding vehicle image N. The display control unit 13 controls display such that the overtaking proposal activation image G reaches the preceding vehicle image N at a timing when automatic overtaking is proposed to the driver of the host vehicle. The ECU 10 proceeds to S16 when the ECU 10 determines that the overtaking proposal activation image G is yet to reach the preceding vehicle image N (S14: NO). The ECU 10 proceeds to S18 when the ECU 10 determines that the overtaking proposal activation image G has reached the preceding vehicle image N (S14: YES).

In S16, the display control unit 13 of the ECU 10 determines again whether or not the display condition is satisfied. The ECU 10 terminates the current processing when the display control unit 13 does not determine that the display condition is satisfied (S16: NO). The ECU 10 repeats the processing from S10 after the elapse of a predetermined time. The ECU 10 repeats the determination of S14 after a predetermined time when the display control unit 13 determines that the display condition is satisfied (S16: YES). When the host vehicle and the preceding vehicle approach each other during the course, the display control unit 13 controls display such that the overtaking proposal activation image G approaches the preceding vehicle image N on the display screen D.

In S18, the automatic overtaking proposal unit 14 of the ECU 10 proposes automatic overtaking to the driver. The automatic overtaking proposal unit 14 proposes the automatic overtaking by voice output by, for instance, transmitting a control signal to the speaker 5. The voice output includes a buzzer-only case. Subsequently, the ECU 10 proceeds to S20.

In S20, the approval determination unit 15 of the ECU 10 determines whether or not the driver has approved the automatic overtaking. The approval determination unit 15 makes the determination based on the input result of the driver input unit 3. The ECU 10 proceeds to S26 when the approval determination unit 15 determines that the driver has approved the automatic overtaking (S20: YES). The ECU 10 proceeds to S22 when the approval determination unit 15 does not determine that the driver has approved the automatic overtaking (S20: NO).

In S22, the approval determination unit 15 of the ECU 10 determines whether or not the driver has declined the automatic overtaking. The approval determination unit 15 makes the determination based on the input result of the driver input unit 3. The ECU 10 terminates the current processing when the approval determination unit 15 determines that the driver has declined the automatic overtaking (S22: YES). The ECU 10 repeats the processing from S10 after the elapse of a predetermined time. The ECU 10 proceeds to S24 when the approval determination unit 15 does not determine that the driver has declined the automatic overtaking (S22: NO).

In S24, the ECU 10 determines whether or not a situation in which automatic overtaking is possible is continuous. The ECU 10 determines that a situation in which automatic overtaking is possible is continuous when, for instance, the display control unit 13 determines that the display condition is satisfied. When the display control unit 13 determines that the display condition is not satisfied, the ECU 10 determines that the situation in which automatic overtaking is possible is not continuous. The ECU 10 may determine whether or not the situation in which automatic overtaking is possible is continuous in a condition other than the display condition.

When the ECU 10 determines that a situation in which automatic overtaking is possible is continuous (S24: YES), the ECU 10 makes the determination of S20 again after a predetermined time. The ECU 10 terminates the current processing when the ECU 10 determines that the situation in which automatic overtaking is possible is not continuous (S24: NO). At this time, the ECU 10 may notify the driver that automatic overtaking has become impossible. The ECU 10 repeats the processing from S10 after the elapse of a predetermined time.

In S26, the vehicle control unit 16 of the ECU 10 executes automatic overtaking by the host vehicle. The vehicle control unit 16 executes the automatic overtaking by transmitting a control signal to the actuator 6. Subsequently, the ECU 10 terminates the current processing.

Figure 4:
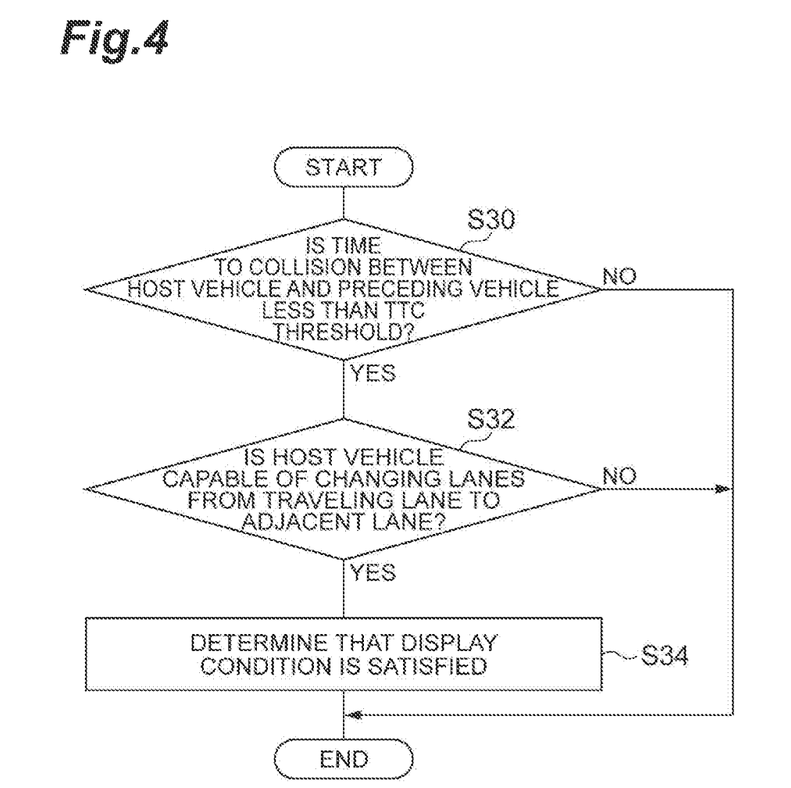
FIG. 4 is a flowchart illustrating an instance of display condition determination processing in the vehicle control device of the first embodiment.

Next, the processing of S10 in FIG. 3 (display condition determination processing) will be described in detail. FIG. 4 is a flowchart illustrating an instance of the display condition determination processing in the vehicle control device of the first embodiment.

As illustrated in FIG. 4, in S30, the display control unit 13 of the ECU 10 determines whether or not the time to collision between the host vehicle and the preceding vehicle is less than the TTC threshold. The display control unit 13 makes the determination based on the relative situation of the preceding vehicle with respect to the host vehicle. The ECU 10 terminates the current processing when the display control unit 13 does not determine that the time to collision between the host vehicle and the preceding vehicle is less than the TTC threshold (S30: NO). The ECU 10 repeats the processing from S30 after the elapse of a predetermined time. The ECU 10 determines NO of S30, when no preceding vehicle is present as well. The ECU 10 proceeds to S32 when the display control unit 13 determines that the time to collision between the host vehicle and the preceding vehicle is less than the TTC threshold (S30: YES).

In S32, the display control unit 13 of the ECU 10 determines whether or not the host vehicle is capable of changing lanes from the traveling lane to the adjacent lane. The display control unit 13 makes the determination based on the surrounding environment regarding the host vehicle. The ECU 10 terminates the current processing when the display control unit 13 does not determine that the host vehicle is capable of changing lanes from the traveling lane to the adjacent lane (S32: NO). The ECU 10 repeats the processing from S30 after the elapse of a predetermined time. The ECU 10 proceeds to S34 when the display control unit 13 determines that the host vehicle is capable of changing lanes from the traveling lane to the adjacent lane (S32: YES).

In S34, the display control unit 13 of the ECU 10 determines that the display condition is satisfied. Subsequently, the ECU 10 proceeds to S12 in FIG. 3.

According to the vehicle control device 100 of the first embodiment described above, the overtaking proposal activation image G and the preceding vehicle image N are displayed based on the relative situation between the host vehicle and the preceding vehicle as an automatic overtaking target and automatic overtaking is proposed to the driver when the overtaking proposal activation image G has reached the preceding vehicle image N. Accordingly, the driver can understand an automatic overtaking proposal activation timing with greater ease than when the overtaking proposal activation image G and the preceding vehicle image N are not displayed. Accordingly, the vehicle control device 100 is capable of suppressing a driver initiating manual operation-based unnecessary preceding vehicle overtaking without being capable of understanding the timing of activation of the automatic overtaking proposal with respect to the preceding vehicle.

According to the vehicle control device 100, the overtaking proposal activation image and the preceding vehicle image are displayed on the display screen when the time to collision between the host vehicle and the preceding vehicle is less than the TTC threshold and the host vehicle is capable of changing lanes from the traveling lane to the adjacent lane. Accordingly, the overtaking proposal activation image G and the preceding vehicle image N are displayed in a scene where the necessity of automatic preceding vehicle overtaking by the host vehicle is high, and thus it is possible to suppress the driver initiating manual operation-based unnecessary overtaking.

Second Embodiment

Figure 5:
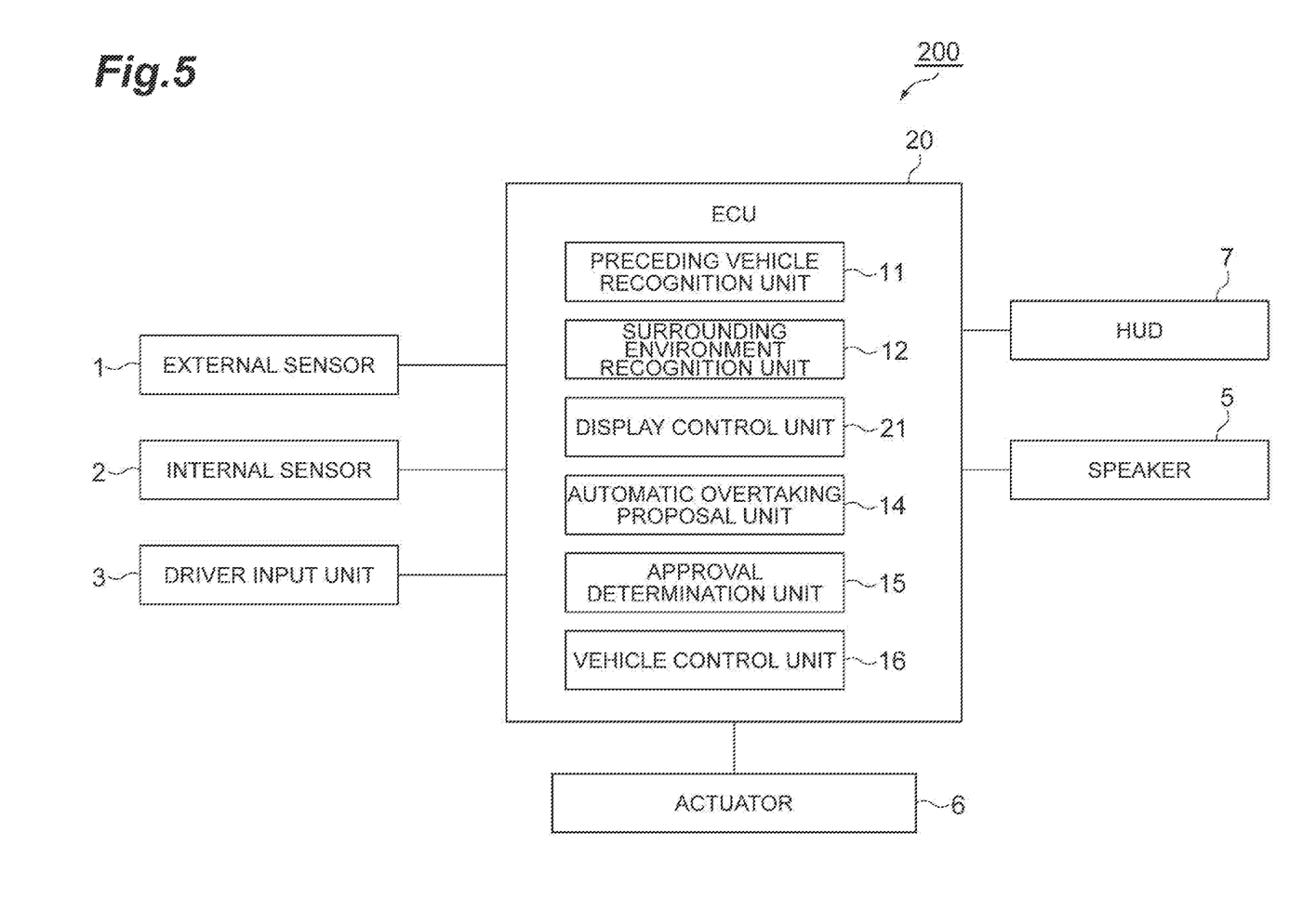
FIG. 5 is a block diagram illustrating a vehicle control device according to a second embodiment.

Next, a vehicle control device according to a second embodiment will be described with reference to accompanying drawings. FIG. 5 is a block diagram illustrating the vehicle control device according to the second embodiment. A vehicle control device 200 illustrated in FIG. 5 differs from the first embodiment in that the vehicle control device 200 projects and displays the overtaking proposal activation image G on a windshield and proposes automatic overtaking when the overtaking proposal activation image reaches the preceding vehicle on the windshield as seen from the driver. Configurations identical or corresponding to those of the first embodiment are denoted by the same reference numerals so that the same description is not repeated.

Configuration of Vehicle Control Device According to Second Embodiment

As illustrated in FIG. 5, the vehicle control device 200 has a head up display [HUD] 7 in place of the display 4 of the first embodiment. In addition, an ECU 20 of the vehicle control device 200 is different from the first embodiment in terms of the function of a display control unit 21.

The HUD 7 is a device mounted in the host vehicle and performing projection display of an image on the windshield (display screen) of the host vehicle. The HUD 7 performs the projection display of an image by, for instance, the HUD 7 emitting light toward the windshield from a projection unit embedded in the dashboard of the host vehicle and a driver visually recognizing the light reflected by the windshield.

The display control unit 21 projects and displays the overtaking proposal activation image G on the windshield based on the relative situation of the preceding vehicle with respect to the host vehicle and the surrounding environment regarding the host vehicle. The display control unit 21 projects and displays the overtaking proposal activation image G when the display control unit 21 determines that a preset display condition is satisfied based on the relative situation of the preceding vehicle with respect to the host vehicle and the surrounding environment regarding the host vehicle. The display condition can be the same as in the first embodiment.

The display control unit 21 projects and displays the overtaking proposal activation image G by transmitting a control signal to the HUD 7. The display control unit 13 controls display such that the overtaking proposal activation image G on a windshield Fg approaches the preceding vehicle as seen from the driver in response to approaching of the host vehicle and the preceding vehicle. The position of the preceding vehicle on the windshield Fg as seen from the driver can be obtained from, for instance, the position of the driver's viewpoint and the imaging information of the camera on the space in front of the host vehicle.

Figure 6A:
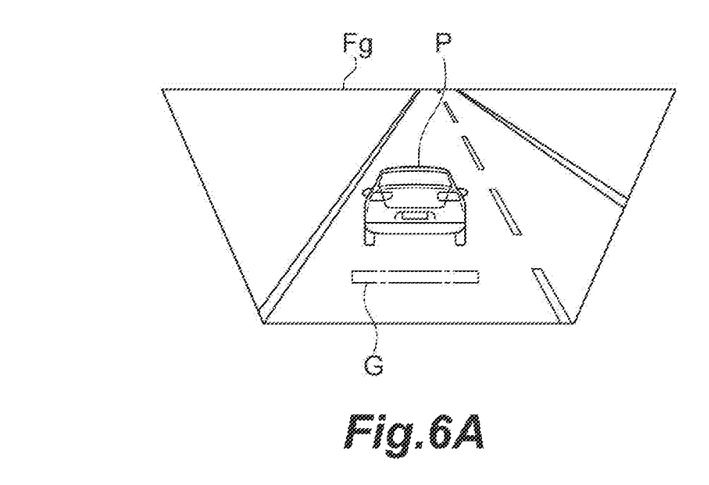
FIG. 6A is a diagram illustrating projection display of the overtaking proposal activation image on a windshield.

FIG. 6A is a diagram illustrating the projection display of the overtaking proposal activation image G on the windshield. Illustrated in FIG. 6A are the windshield Fg, a preceding vehicle P, and the overtaking proposal activation image G. The preceding vehicle P is not an image. The preceding vehicle P is a non-host vehicle that the driver actually sees through the windshield Fg. The position of the driver's viewpoint can be a preset position. The position of the driver's viewpoint may be determined by setting input by the driver during the initial setting of the HUD 7 of the host vehicle. When the host vehicle is provided with a driver monitor camera, the position of the driver's viewpoint may be calculated by the driver's viewpoint by analyzed a face image of the driver from an image captured by the driver monitor camera.

The overtaking proposal activation image G is a linear display extending in the width direction of the lane. As in the first embodiment, the shape of the overtaking proposal activation image G is not limited to the linear shape. The overtaking proposal activation image G may be V-shaped, triangular, or rectangular. The overtaking proposal activation image G may be an area extending forward from the host vehicle image M. The overtaking proposal activation image G may have any shape insofar as the driver can be notified of an automatic overtaking proposal activation timing.

As illustrated in FIG. 6A, the display control unit 21 displays the overtaking proposal activation image G at a position between the host vehicle and the preceding vehicle P as seen from the driver. The display control unit 13 displays such that the overtaking proposal activation image G on the windshield Fg approaches the preceding vehicle P as seen from the driver in response to approaching of the host vehicle and the preceding vehicle P.

Figure 6B:
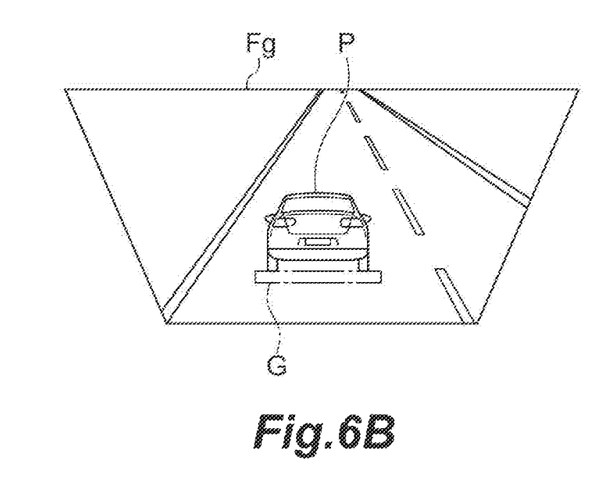
FIG. 6B is a diagram illustrating a time when the overtaking proposal activation image has reached a preceding vehicle on the windshield.

FIG. 6B is a diagram illustrating a time when the overtaking proposal activation image G has reached the preceding vehicle P on the windshield Fg. As illustrated in FIG. 6B, the display control unit 21 controls display such that the overtaking proposal activation image G reaches the preceding vehicle P on the windshield Fg as seen from the driver at a timing when automatic overtaking is proposed to the driver of the host vehicle. The timing at which the automatic overtaking is proposed to the driver of the host vehicle is a preset timing. The timing at which the automatic overtaking is proposed to the driver of the host vehicle can be, for instance, the same as in the first embodiment.

The overtaking proposal activation image G reaching the preceding vehicle P is not limited to a case where the end portion of the overtaking proposal activation image G (on the preceding vehicle P side) strictly comes into contact with the preceding vehicle P. The overtaking proposal activation image G reaching the preceding vehicle P may be determined when a part of the overtaking proposal activation image G overlaps the preceding vehicle P. In this determination, a deviation attributable to image accuracy or calculation accuracy is allowed.

Processing of Vehicle Control Device According to Second Embodiment

Figure 7:
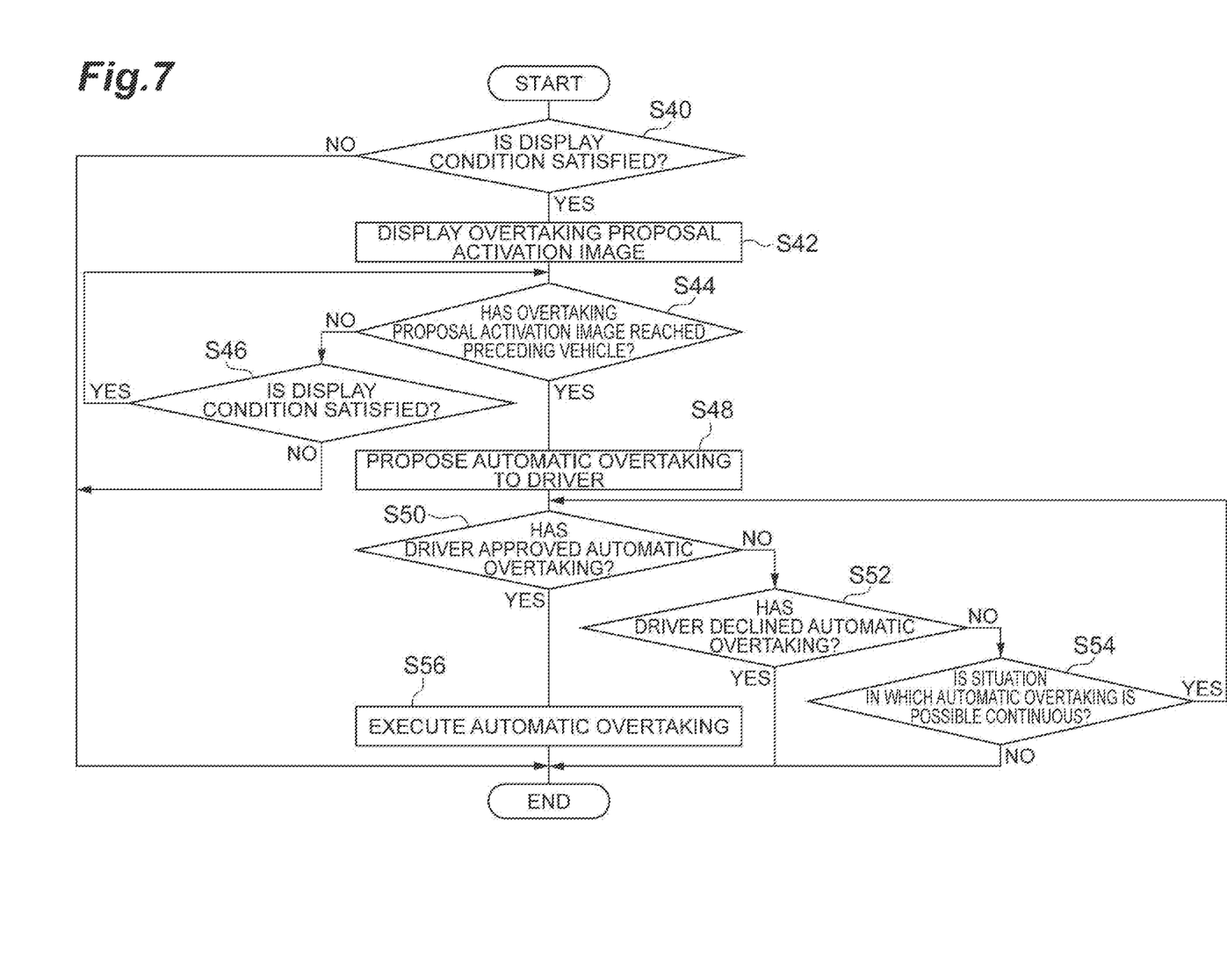
FIG. 7 is a flowchart illustrating an instance of overtaking proposal activation image processing in the vehicle control device of the second embodiment.

Next, processing of the vehicle control device 200 according to the second embodiment will be described with reference to FIG. 7. FIG. 7 is a flowchart illustrating an instance of the automatic overtaking processing in the vehicle control device 200 according to the second embodiment. The automatic overtaking processing is executed during, for instance, autonomous driving of the host vehicle. Alternatively, the automatic overtaking processing is executed when the driver permits an automatic overtaking proposal during traveling of the host vehicle.

The processing of S40, S46, and S48 to S56 is identical to the processing of S10, S16, and S18 to S26 in FIG. 3.

As illustrated in FIG. 7, the display control unit 21 of the ECU 20 determines in S40 whether or not a display condition is satisfied. The ECU 20 terminates the current processing when the display control unit 21 does not determine that the display condition is satisfied (S40: NO). The ECU 20 repeats the processing from S40 after the elapse of a predetermined time. The ECU 20 proceeds to S42 when the display control unit 21 determines that the display condition is satisfied (S40: YES).

In S42, the display control unit 21 of the ECU 20 projects and displays the overtaking proposal activation image G on the windshield Fg. The display control unit 21 projects and displays the overtaking proposal activation image G on the windshield Fg by transmitting a control signal to the HUD 7. The display control unit 21 displays the overtaking proposal activation image G at a position between the host vehicle (such as the front end of the host vehicle) and the preceding vehicle P on the windshield Fg based on the relative situation of the preceding vehicle P with respect to the host vehicle. Subsequently, the ECU 20 proceeds to S44.

In S44, the ECU 20 determines in the display control unit 21 whether or not the overtaking proposal activation image G has reached the preceding vehicle P. The display control unit 21 controls display such that the overtaking proposal activation image G reaches the preceding vehicle P on the windshield Fg as seen from the driver at a timing when automatic overtaking is proposed to the driver of the host vehicle. The ECU 20 proceeds to S46 when the ECU 20 determines that the overtaking proposal activation image G is yet to reach the preceding vehicle P (S44: NO). The ECU 20 proceeds to S48 when the ECU 20 determines that the overtaking proposal activation image G has reached the preceding vehicle P (S44: YES).

In S46, the display control unit 21 of the ECU 20 determines again whether or not the display condition is satisfied. The ECU 20 terminates the current processing when the display control unit 21 does not determine that the display condition is satisfied (S46: NO). The ECU 20 repeats the processing from S40 after the elapse of a predetermined time. The ECU 20 repeats the determination of S44 after a predetermined time when the display control unit 21 determines that the display condition is satisfied (S46: YES). When the host vehicle and the preceding vehicle approach each other during the course, the display control unit 21 controls display such that the overtaking proposal activation image G approaches the preceding vehicle P on the windshield Fg.

In S48, the automatic overtaking proposal unit 14 of the ECU 20 proposes automatic overtaking to the driver. The automatic overtaking proposal unit 14 proposes the automatic overtaking by voice output by, for instance, transmitting a control signal to the speaker 5. Subsequently, the ECU 20 proceeds to S50.

In S50, the approval determination unit 15 of the ECU 20 determines whether or not the driver has approved the automatic overtaking. The approval determination unit 15 makes the determination based on the input result of the driver input unit 3. The ECU 20 proceeds to S56 when the approval determination unit 15 determines that the driver has approved the automatic overtaking (S50: YES). The ECU 20 proceeds to S52 when the approval determination unit 15 does not determine that the driver has approved the automatic overtaking (S50: NO).

In S52, the approval determination unit 15 of the ECU 20 determines whether or not the driver has declined the automatic overtaking. The approval determination unit 15 makes the determination based on the input result of the driver input unit 3. The ECU 20 terminates the current processing when the approval determination unit 15 determines that the driver has declined the automatic overtaking (S52: YES). The ECU 20 repeats the processing from S40 after the elapse of a predetermined time. The ECU 20 proceeds to S54 when the approval determination unit 15 does not determine that the driver has declined the automatic overtaking (S52: NO).

In S54, the ECU 20 determines whether or not a situation in which automatic overtaking is possible is continuous. The ECU 20 determines that a situation in which automatic overtaking is possible is continuous when, for instance, the display control unit 21 determines that the display condition is satisfied. When the display control unit 21 determines that the display condition is not satisfied, the ECU 20 determines that the situation in which automatic overtaking is possible is not continuous. The ECU 20 may determine whether or not the situation in which automatic overtaking is possible is continuous in a condition other than the display condition.

When the ECU 20 determines that a situation in which automatic overtaking is possible is continuous (S54: YES), the ECU 20 makes the determination of S50 again after a predetermined time. The ECU 20 terminates the current processing when the ECU 20 determines that the situation in which automatic overtaking is possible is not continuous (S54: NO). At this time, the ECU 20 may notify the driver that automatic overtaking has become impossible. The ECU 20 repeats the processing from S40 after the elapse of a predetermined time.

In S56, the vehicle control unit 16 of the ECU 20 executes automatic overtaking by the host vehicle. The vehicle control unit 16 executes the automatic overtaking by transmitting a control signal to the actuator 6. Subsequently, the ECU 20 terminates the current processing.

The display condition determination processing of the vehicle control device 200 can be similar to that of the first embodiment (see FIG. 4).

According to the vehicle control device 200 of the second embodiment described above, the overtaking proposal activation image G is projected and displayed on the windshield Fg based on the relative situation between the host vehicle and the preceding vehicle P as an automatic overtaking target and automatic overtaking is proposed to the driver when the overtaking proposal activation image G has reached the preceding vehicle P on the windshield Fg as seen from the driver. Accordingly, the driver can understand an automatic overtaking proposal activation timing with greater ease than when the overtaking proposal activation image G is not displayed. Accordingly, the vehicle control device 200 is capable of suppressing the driver initiating manual operation-based unnecessary overtaking of the preceding vehicle P without being capable of understanding the timing of activation of the automatic overtaking proposal with respect to the preceding vehicle P.

According to the vehicle control device 200, the overtaking proposal activation image G is projected and displayed on the windshield Fg when the time to collision between the host vehicle and the preceding vehicle P is less than the TTC threshold and the host vehicle is capable of changing lanes from the traveling lane to the adjacent lane as in the first embodiment. Accordingly, the overtaking proposal activation image G is displayed in a scene where the necessity of automatic overtaking of the preceding vehicle P by the host vehicle is high, and thus it is possible to suppress a driver initiating manual operation-based unnecessary overtaking.

Although preferred embodiments of the present disclosure have been described above, the present disclosure is not limited to the above-described embodiments. The present disclosure can be carried out in various forms starting from the above-described embodiments and modified and improved in various ways based on the knowledge of those skilled in the art.

For instance, in the first embodiment, the image display for notifying the driver of the automatic overtaking proposal timing does not have to be the image display in plan view illustrated in FIGS. 2A and 2B. The display control unit 13 may display a side view image in which, for instance, the overtaking proposal activation image (3 the host vehicle image M, and the preceding vehicle image N are aligned in the lateral direction (width direction of the host vehicle). Alternatively, the display control unit 13 may display an image in which the overtaking proposal activation image G and the preceding vehicle image N are aligned in front of the host vehicle as in FIGS. 6A and 6B of the second embodiment. The mode of the image display is not particularly limited insofar as the driver can be notified of an automatic overtaking proposal timing.

In the first embodiment, the display of the host vehicle image M is optional. In addition, the first division line image L1, the second division line image L2, and the third division line image L3 do not necessarily have to be displayed. In addition, the display control unit 13 may display the host vehicle image M and the preceding vehicle image N at regular intervals regardless of the relative situation between the host vehicle and the preceding vehicle. The driver can be notified of the automatic overtaking proposal timing by the interval between the preceding vehicle image N and the overtaking proposal activation image G.

The vehicle control devices 100 and 200 may use at least one of time headway [THW] or the inter-vehicle distance in place of the time to collision. The display control units 13 and 21 may determine that the display condition is satisfied when, for instance, the time headway between the host vehicle and the preceding vehicle is less than a preset THW threshold in place of the time to collision between the host vehicle and the preceding vehicle being less than the TTC threshold. Likewise, the display control units 13 and 21 may determine that the display condition is satisfied when the inter-vehicle distance between the host vehicle and the preceding vehicle is less than a preset inter-vehicle distance threshold. In this regard, the automatic overtaking proposal timing also may use at least one of the time headway and the inter-vehicle distance in place of the time to collision.

The display control unit 13 may display the overtaking proposal activation image G, the host vehicle image M, and the preceding vehicle image N at all times during host vehicle traveling with no display condition provided. Alternatively, the display control unit 13 may display the overtaking proposal activation image G the host vehicle image M, and the preceding vehicle image N at all times when an automatic overtaking proposal is permitted. The same applies to the second embodiment.

The invention claimed is:

1. A vehicle control device controlling a host vehicle and providing a driver of the host vehicle with information related to the vehicle control by using a display screen of the host vehicle, the vehicle control device comprising:
 a preceding vehicle recognition unit configured to recognize a relative situation of a preceding vehicle with respect to the host vehicle;
 a surrounding environment recognition unit configured to recognize a surrounding environment of the host vehicle;
 a display control unit configured to display a preceding vehicle image corresponding to the preceding vehicle and an overtaking proposal activation image for indicating a timing of activation of a proposal for automatic overtaking of the preceding vehicle by the host vehicle on the display screen based on the relative situation of the preceding vehicle with respect to the host vehicle and the surrounding environment of the host vehicle, and configured to control the display such that the overtaking proposal activation image and the preceding vehicle image approach each other in response to the host vehicle approaching the preceding vehicle;

an automatic overtaking proposal unit configured to propose the automatic overtaking to the driver when the overtaking proposal activation image reaches the preceding vehicle image on the display screen;

an approval determination unit configured to determine whether or not the driver has approved the automatic overtaking; and a vehicle control unit configured to execute the automatic overtaking of the preceding vehicle by the host vehicle when the approval determination unit determines that the driver has approved the automatic overtaking.

2. The vehicle control device according to claim 1, wherein the display control unit is configured to display the overtaking proposal activation image and the preceding vehicle image on the display screen, when time to collision between the host vehicle and the preceding vehicle is less than a TTC threshold and the host vehicle is capable of changing lanes from a traveling lane to an adjacent lane.

3. A vehicle control device controlling a host vehicle and providing a driver of the host vehicle with information related to the vehicle control by using a HUD performing projection display on a windshield of the host vehicle, the vehicle control device comprising:

a preceding vehicle recognition unit configured to recognize a relative situation of a preceding vehicle with respect to the host vehicle;

a surrounding environment recognition unit configured to recognize a surrounding environment of the host vehicle;

a display control unit configured to project and display an overtaking proposal activation image for indicating a timing of activation of a proposal for automatic overtaking of the preceding vehicle by the host vehicle on the windshield based on the relative situation of the preceding vehicle with respect to the host vehicle and the surrounding environment of the host vehicle;

an automatic overtaking proposal unit configured to propose the automatic overtaking to the driver when the overtaking proposal activation image reaches the preceding vehicle on the windshield as seen from the driver;

an approval determination unit configured to determine whether or not the driver has approved the automatic overtaking; and a vehicle control unit configured to execute the automatic overtaking of the preceding vehicle by the host vehicle when the approval determination unit determines that the driver has approved the automatic overtaking.

4. The vehicle control device according to claim 3, wherein the display control unit is configured to project and display the overtaking proposal activation image on the windshield, when time to collision between the host vehicle and the preceding vehicle is less than a TTC threshold and the host vehicle is capable of changing lanes from a traveling lane to an adjacent lane.

* * * * *